No. 894,609.   
T. M. DAVIES.   
PATENTED JULY 28, 1908.
WHEEL SPECIALLY ADAPTED TO RECEIVE AN AUXILIARY OR SPARE RIM.
APPLICATION FILED FEB. 18, 1908.
2 SHEETS—SHEET 1.
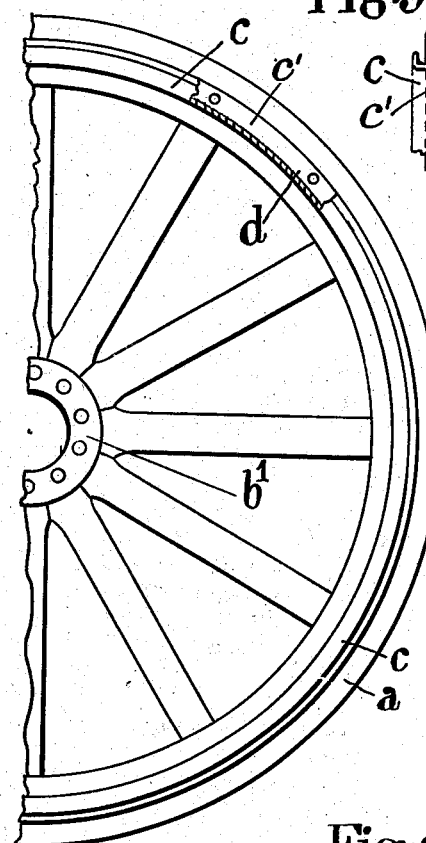
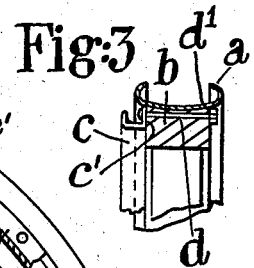
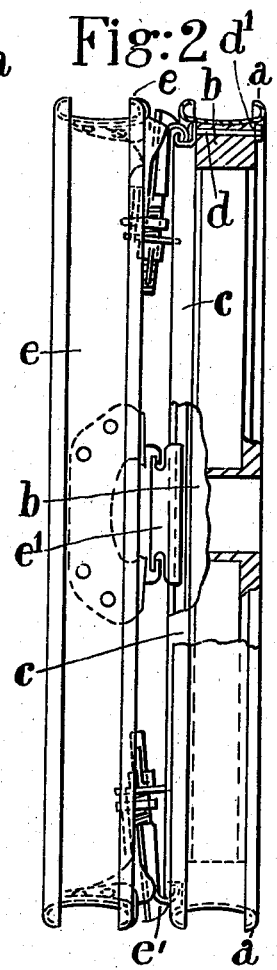
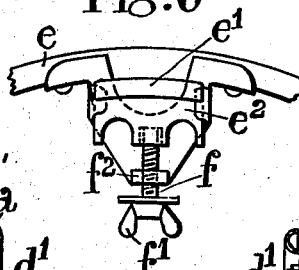
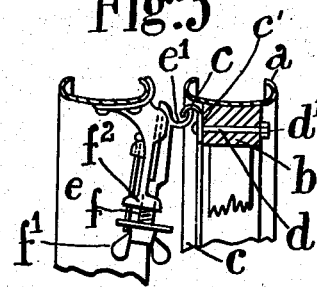
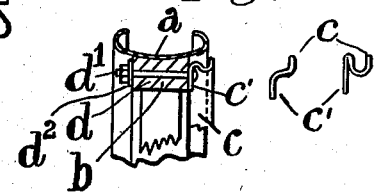

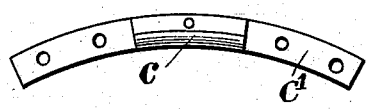
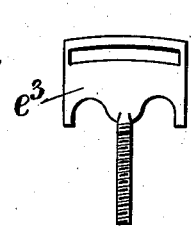
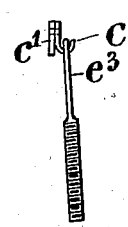
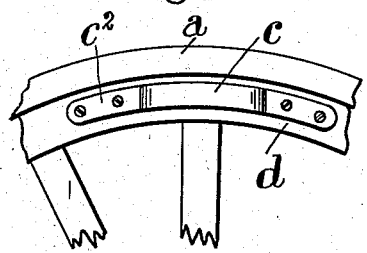
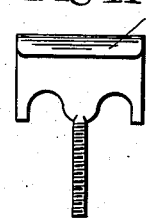
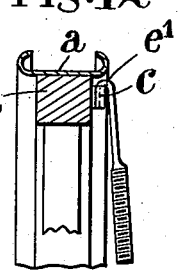
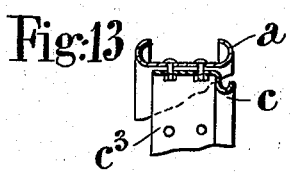
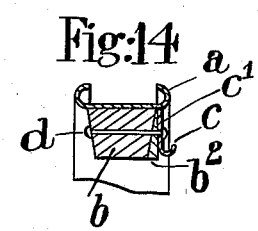
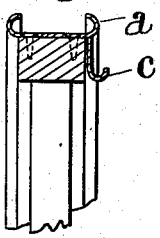
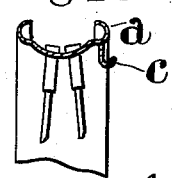

UNITED STATES PATENT OFFICE.

THOMAS M. DAVIES, OF LLANELLY, ENGLAND.

WHEEL SPECIALLY ADAPTED TO RECEIVE AN AUXILIARY OR SPARE RIM.

No. 894,609.

Specification of Letters Patent.

Patented July 28, 1908.

Application filed February 18, 1908. Serial No. 416,468.

*To all whom it may concern:*

Be it known that I, THOMAS MORRIS DAVIES, subject of the King of Great Britain, residing at Llanelly, in the county of Carmarthen, Wales, England, have invented a new and useful Wheel Specially Adapted to Receive an Auxiliary or Spare Rim, of which the following is a specification.

Heretofore spare rims, each carrying a fully inflated tire, have been attached to the rim of a wheel fixed to a motor car, hereinafter referred to as the fixed wheel, by hooks or other means which gripped the outer edge of the metal rim of the fixed wheel. In such a method of attaching spare rims it has been necessary to push the edge of the outer cover of the pneumatic tire laterally to enable the spare rim to be properly attached to the fixed wheel, and such outer edges occasionally are very firmly embedded in the rim. If, to prevent skidding or for other reason, it has been desired to fix a spare rim to a fixed wheel having an unpunctured tire, it has also been necessary to deflate the pneumatic tire of the fixed wheel to enable the said edge to be moved laterally away from the side of the rim.

The object of the present invention is to construct the fixed wheels in such a manner that a spare rim carrying a pneumatic tire may always be readily applied thereto. It is thus possible to attach a spare rim carrying a fully inflated tire of any type to a fixed wheel having a punctured tire, and it is also possible to rapidly apply a spare rim carrying a non-slipping tire to a fixed wheel having an unpunctured smooth pneumatic tire without deflating this latter.

According to the present invention the fixed wheel is provided with a continuous extra flange on its outer face onto which the spare rim may be securely fastened by means of the usual hooks and other devices already known. Or in lieu of a continuous extra flange, a number of separated portions of said flange may be employed, each portion being somewhat in the form of a hook or loop. This extra flange is preferably of such a diameter that it is close to the metal rim of the fixed wheel and it is preferably so located and of such width that it does not project laterally beyond the aforesaid metal rim.

When applied to a wheel having only a metal rim, the extra flange is conveniently formed on a cylindrical ring which is riveted or otherwise fixed to the flat portion of the fixed metal rim.

When applied to a wheel having a wooden felly surrounded by a metal rim the extra flange is conveniently formed on a flat or slightly conical ring which is bolted to the wooden felly, in which case the bolt heads or nuts may be provided on the inner side of the fixed wheel with large washers to distribute the strain over a large area of the felly. In this latter construction the flange may be formed on either edge of the flat or conical ring, that is to say, on the edge which is nearer to or farther from the hub of the fixed wheel.

The so-called flange attached to the fixed wheel may conform to the shape of one edge of an ordinary metal rim adapted to receive a pneumatic tire, or it may be of any other suitable section, according to the kind of fixing means carried by the spare rim.

Should the wooden felly be of such a section that the flat or slightly conical ring carrying the flange cannot be securely fastened thereto by means of bolts and nuts, it may be necessary to employ distance pieces placed between the said flat or slightly conical ring and the wooden felly, which distance pieces may be secured by the bolts used to attach the said ring to the wooden felly.

The invention is illustrated in the accompanying drawings, in which

Figure 1 is a side elevation of part of a fixed wheel, and Fig. 2 is an edge view partly in section showing an ordinary spare rim adapted to carry an inflated pneumatic tire and the fixed wheel shown in Fig. 1 to which such spare rim is attached; Fig. 3 is a cross section through the felly of the said fixed wheel; Fig. 4 is a cross section of a felly of a fixed wheel very similar to that shown in Figs. 1, 2 and 3. Fig. 4 also shows cross sections of other forms of flanges of somewhat different shapes. In all these figures the extra flange is bent outwards away from the hub. Fig. 5 shows a cross section of a felly of a fixed wheel in which the extra flange is bent towards the hub and it also shows part of a spare rim attached thereto; Fig. 6 is a side elevation of part of a spare rim similar to that shown in Fig. 5. Fig. 7 is a side elevation of a plate carrying a portion of an extra flange; Fig. 8 is a side elevation of part of the clip carried by a spare rim adapted to engage with the extra flange shown in Fig. 7; Fig. 9 is a side elevation of the parts shown in Figs. 7 and 8 acting in conjunction with each other. Fig. 10 is a side elevation of part of a fixed wheel having a portion of an extra flange in the form of a loop; Fig. 11 is a side elevation of the usual hook fastening adapted to engage the loop shown in Fig. 10, and Fig. 12 is a side elevation of the parts shown in Figs. 10 and 11 acting in conjunction with each other. Fig. 13 is a cross section of an ordinary metal rim such as is used with wire spokes with an extra flange applied thereto. Fig. 14 is a cross section of a metal rim and wood felly in which the two sides of the latter are not parallel to each other, with an extra flange applied to such felly. Fig. 15 is a cross section of a metal rim and wooden felly showing another method of fixing the extra flange. Fig. 16 is a cross section of a metal rim as used with wire spokes showing the extra flange applied thereto in a similar manner to that shown in Fig. 15.

Referring to Figs. 1 to 3, $a$ is the usual rim adapted to receive a pneumatic tire and fixed around the wooden felly $b$. $c$ is an extra continuous flange of trough shape in cross section carried by a flat ring $c'$, and having its outer edge presented outwardly or away from the hub $b'$ of the fixed wheel. The flange $c$ and ring $c'$ are rolled or otherwise formed in one piece. This extra flange $c$ is secured to the outer face of the wooden felly $b$ by bolts $d$ passing through the ring $c'$ and the felly and held in position by nuts $d'$. The spare rim $e$ is of the usual construction but its hook shaped clips $e'$, instead of engaging with the edge of the rim $a$, engage with the continuous extra flange $c$.

Fig. 4 shows various sections of extra continuous flanges $c$ adapted to be bolted to the wooden felly $b$. It will be noticed that the flat portion $c'$ through which the headed ends of the bolts $d$ pass, projects towards the hub, whereas in Figs. 1, 2 and 3 it projects away from the hub. In this view large washers $d^2$ are shown between the nuts $d'$ and the wooden felly $b$ to distribute the strain over a large area.

The wooden felly is usually of less width than the width of its metal rim, which enables the flange to be arranged so that it does not project laterally beyond said metal rim.

In Figs. 5 and 6 the extra flange $c$ is bent over towards the hub of the fixed wheel and the radially moving parts $e^2$ of the auxiliary rim $e$ have their hook shaped parts $e'$ curved outwards away from the hub. In this construction the screws $f$ have winged heads $f'$ and pass through screw threaded parts $f^2$ carried by the auxiliary rim $e$. The screws $f$ enter sockets in the radially moving parts $e^2$ which latter are mounted in guides as usual.

In Fig. 7 the extra flange $c$ is not continuous but consists of a number of segments of a circle, each of which is carried by a plate $c'$ having holes therein by which it may be bolted to a wooden felly. The radially moving parts or clips $e^3$ of the auxiliary rim for use with such an extra flange are preferably slotted as shown so as to pass over the segmental flanges $c$.

In Fig. 10 the segmental extra flange $c$ projects laterally from the plate $c^2$ in the form of a loop. It is actually part of the plate $c^2$ bent laterally to receive the usual hooks $e'$ of an auxiliary rim.

The advantage of using the extra flanges $c$ shown in Figs. 7, 9, 10 and 12 and the special form of clip shown in Fig. 8 is that the auxiliary rim $e$ is prevented from creeping with relation to the fixed rim without the use of a fork or strap to engage a spoke of the fixed wheel.

Fig. 13 shows a metal rim $a$ to which an extra flange $c$ is riveted. In this construction the extra flange $c$ is fixed to a cylindrical ring $c^3$ which latter fits the interior periphery of the rim $a$ and is riveted thereto.

Some wooden fellies $b$, as shown at Fig. 14, have a wedge shaped section, that is to say, the inner and outer faces are not parallel. With such fellies it is necessary to employ filling up or distance pieces $b^2$ between the felly $b$ and the inner side of the extra flange $c$. These distance pieces $b^2$ are secured by the bolts $d$ which attach the extra flange $c$ to the felly $b$.

In Figs. 15 and 16 the extra flange $c$ is shown brazed or welded to the metal rim $a$.

What I claim as my invention is:—

1. In a wheel, the combination of a rim adapted to carry a pneumatic tire, and a laterally projecting flange fixed to such wheel and adapted to receive the clips carried by an auxiliary rim, substantially as set forth.

2. In a wheel, the combination of a rim adapted to carry a pneumatic tire, a laterally projecting flange adapted to receive the clips carried by an auxiliary rim, and means connecting the laterally projecting flange to the felly, substantially as set forth.

3. In a wheel, the combination of a rim adapted to carry a pneumatic tire, and a laterally projecting flange formed in separate parts fixed to such wheel and adapted to receive the clips carried by an auxiliary rim, substantially as set forth.

4. In a wheel, the combination of a rim adapted to carry a pneumatic tire, a laterally projecting flange formed in separate parts adapted to receive the clips carried by an auxiliary rim, and means connecting the laterally projecting flange to the felly, substantially as set forth.

5. In a wheel, the combination of a rim adapted to carry a pneumatic tire, and a laterally projecting flange fixed to such wheel and formed in separate parts in the shape of loops adapted to receive the clips carried by an auxiliary rim, substantially as set forth.

In witness whereof I have hereunto set my hand in presence of two witnesses.

THOMAS M. DAVIES.

Witnesses:
   THEO. PHILLIPS,
   D. M. THOMAS.